US012627659B1

(12) United States Patent
Gorman et al.

(10) Patent No.: US 12,627,659 B1
(45) Date of Patent: May 12, 2026

(54) BIOMETRIC IDENTIFICATION FOR RESOURCE ACCESS DISTRIBUTION

(71) Applicant: THE HUNTINGTON NATIONAL BANK, Columbus, OH (US)

(72) Inventors: Timothy Gorman, Columbus, OH (US); Jason W. Black, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/072,127

(22) Filed: Mar. 6, 2025

Related U.S. Application Data

(63) Continuation of application No. 19/071,988, filed on Mar. 6, 2025.

(51) Int. Cl.
*H04L 9/40* (2022.01)

(52) U.S. Cl.
CPC ........ *H04L 63/0861* (2013.01); *H04L 63/102* (2013.01)

(58) Field of Classification Search
CPC ........................... H04L 63/0861; H04L 63/102
See application file for complete search history.

(56) References Cited

U.S. PATENT DOCUMENTS

| 2006/0095780 A1* | 5/2006 | Hillis | H04L 63/083 |
| | | | 713/182 |
| 2009/0241183 A1* | 9/2009 | Boss | G06F 40/131 |
| | | | 715/255 |
| 2016/0275667 A1* | 9/2016 | Modica | G01S 17/06 |
| 2017/0124595 A1* | 5/2017 | Costache | H04L 67/306 |
| 2017/0208060 A1* | 7/2017 | Hanifen | H04W 12/068 |
| 2019/0140833 A1* | 5/2019 | Grajek | H04L 9/3231 |
| 2021/0344663 A1* | 11/2021 | Rallabhandi | G06F 21/45 |
| 2022/0245232 A1* | 8/2022 | Mclachlan | G06Q 20/4014 |
| 2022/0400012 A1* | 12/2022 | Tran | H04L 9/3231 |

OTHER PUBLICATIONS

M. Sultana, P. P. Paul and M. L. Gavrilova, "Social Behavioral Information Fusion in Multimodal Biometrics," in IEEE Transactions on Systems, Man, and Cybernetics: Systems, vol. 48, No. 12, pp. 2176-2187, Dec. 2018, doi: 10.1109/TSMC.2017.2690321. (Year: 2018).*

* cited by examiner

*Primary Examiner* — Piotr Poltorak
(74) *Attorney, Agent, or Firm* — Kilpatrick Townsend & Stockton LLP

(57) ABSTRACT

Resource access distribution can be managed by biometric identification. For example, a system can receive a request from a device indicating an identity of a user and an intention of the user to access a resource of a computing system. The system can determine biometric data associated with an individual within a predetermined distance from the terminal. The system can decompose the biometric data into biometric sub attributes associated with the individual and retrieve stored sub attributes associated with the identity of the user. The system can determine a confidence score that the individual is the user by comparing the biometric sub attributes associated with the individual to the stored sub attributes. The system can perform an action that including one of (i) preventing the individual from accessing the resource or (ii) allowing the individual to access the resource.

17 Claims, 8 Drawing Sheets

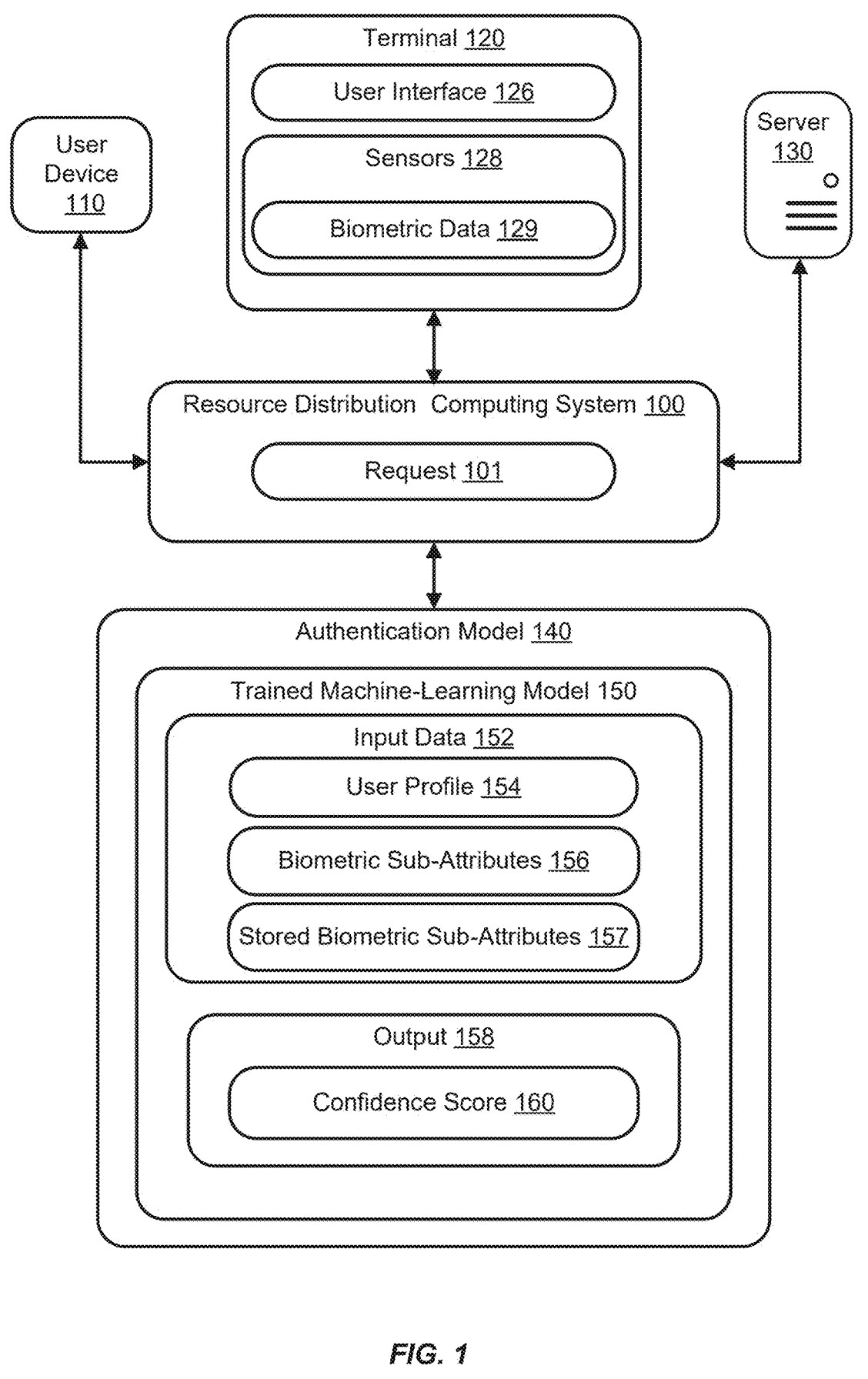

Terminal 120

User Interface 126

Sensors 128

Biometric Data 129

User Device 110

Server 130

Resource Distribution Computing System 100

Request 101

Authentication Model 140

Trained Machine-Learning Model 150

Input Data 152

User Profile 154

Biometric Sub-Attributes 156

Stored Biometric Sub-Attributes 157

Output 158

Confidence Score 160

*FIG. 1*

Receive Request to
Access at least one
Resource
402

Capture
Biometric Data
404

Decompose
Biometric Data into
Sub Attribute(s)
406

Determine Confidence
Score by Comparing
Captured Sub Attributes
to Stored Sub Attributes
408

Allow Access to at least
one Resource if Confidence
Score Exceeds Pre-Set
Threshold
410

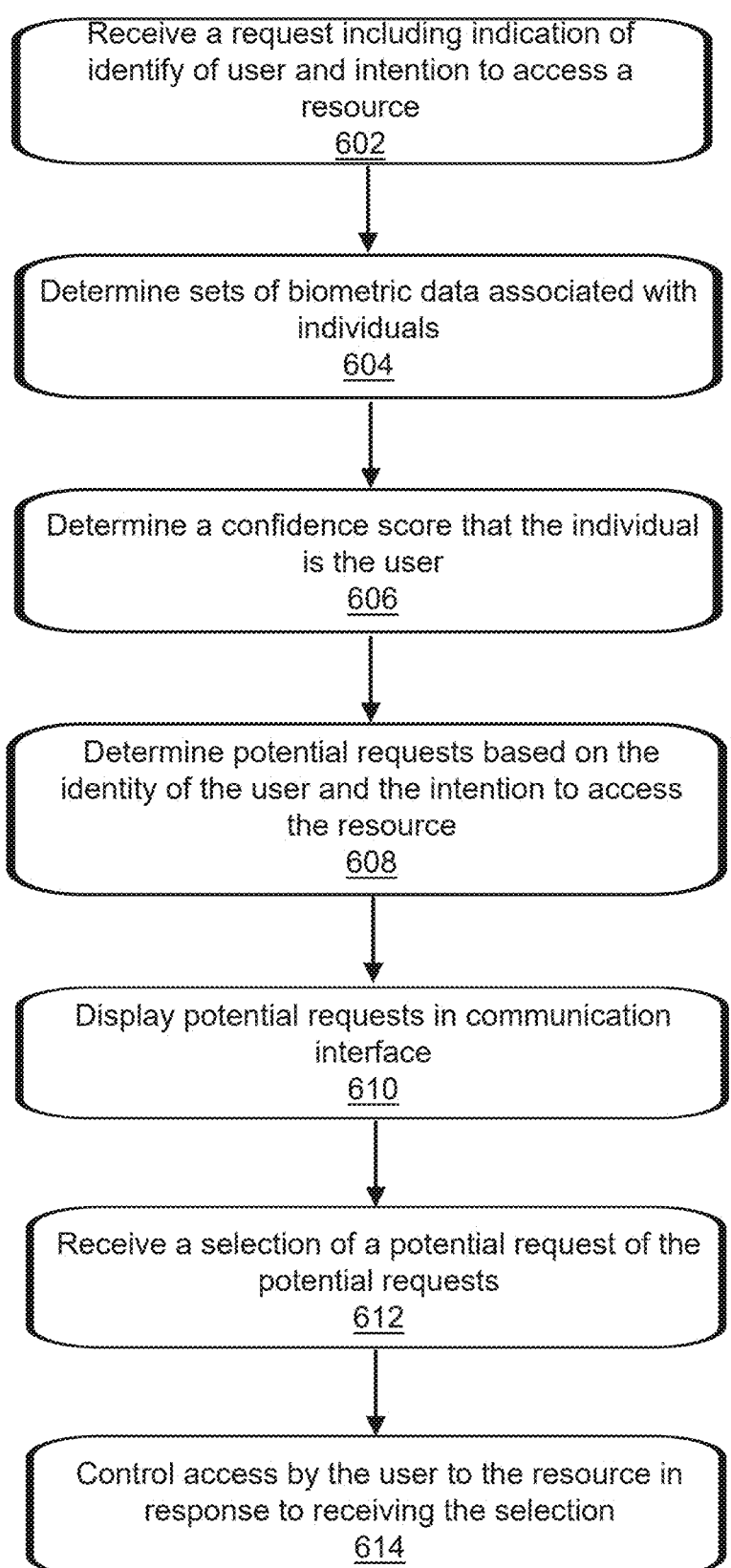

Receive a request including indication of identify of user and intention to access a resource
602

Determine sets of biometric data associated with individuals
604

Determine a confidence score that the individual is the user
606

Determine potential requests based on the identity of the user and the intention to access the resource
608

Display potential requests in communication interface
610

Receive a selection of a potential request of the potential requests
612

Control access by the user to the resource in response to receiving the selection
614

*FIG. 6*

Determine
Confidence Score
Lower than
Threshold
702

Retrieve Known
Fraud Actor Profiles
704

Calculate Fraud Score by
Comparing Biometric Sub-
Attributes to Known Fraud
Actor Biometric Sub-
Attributes
706

Restrict Access or
Issue Alert if Fraud
Score is above the
Predetermined
Threshold
708

Receive a request to access
a first profile associated with
a user
802

Determine that the user
accessed a second profile
associated with the user
804

Merge the first profile with
the second profile into a
third profile associated with
the user
806

Remove at least one of
the first profile and the
second profile
808

BIOMETRIC IDENTIFICATION FOR RESOURCE ACCESS DISTRIBUTION

CROSS-REFERENCE TO RELATED APPLICATION

This is a continuation of U.S. patent application Ser. No. 19/071,988, filed Mar. 6, 2025, and titled "BIOMETRIC IDENTIFICATION FOR RESOURCE ACCESS DISTRIBUTION," the entirety of which is incorporated herein by reference.

TECHNICAL FIELD

The disclosure is generally directed to secure access to a resource distribution system. Specifically, the disclosure is directed to techniques for improving the speed, security, and efficiency of resource distribution system based on biometric identification.

BACKGROUND

Resource distribution systems often manage sensitive resources that may only be distributed by specific users. Resources may be stored in an account, and users may have profiles that include which accounts the user is allowed to access. A typical transaction in a resource distribution system involves receiving a request from a user to access resources, authenticating the identity of the user as a user authorized to access the resources, and allowing the user to access the resources in response to a positive identification. Authenticating the identity of a user may be done using passwords, photo identification, and more recently biometric identification. In biometric identification, user features, biometric identifier's, are analyzed to authenticate the identity of the user. Drawbacks of traditional resource distribution systems employing biometric identification include slow authentication, inaccurate biometric identification, and burdensome storage requirements.

SUMMARY

In some embodiments, a system can include a processor and a memory communicatively coupled to the processor. The memory can include instructions executable by the processor for causing the processor to perform operations. The operations can involve receiving a request from a device indicating an identity of a user and an intention of the user to access at least one resource of a computing system at a terminal of the computing system, and determining, based on captured sensor data, a plurality of sets of biometric data. Each set of biometric data can be associated with an individual of a plurality of individuals within a first predetermined distance from the terminal. The operations can also involve decomposing at least one of the plurality of sets of biometric data into a plurality of biometric sub attributes associated with the individual, retrieving a plurality of stored sub attributes associated with the identity of the user, and determining a confidence score that the individual is the user by comparing, using a machine learning model, the plurality of biometric sub attributes associated with the individual to the plurality of stored sub attributes associated with the identity. The operations can also involve performing an action that includes one of (i) preventing the individual from accessing the at least one resource in response to determining the confidence score is below a pre-set threshold or (ii) allowing the individual to access the at least one resource in response to determining the confidence score is above the pre-set threshold.

In some embodiments, a method can involve receiving a request from a device indicating an identity of a user and an intention of the user to access at least one resource of a computing system at a terminal of the computing system, and determining, based on captured sensor data, a plurality of sets of biometric data. Each set of biometric data can be associated with an individual of a plurality of individuals within a first predetermined distance from the terminal. The method can also involve decomposing at least one of the plurality of sets of biometric data into a plurality of biometric sub attributes associated with the individual, retrieving a plurality of stored sub attributes associated with the identity of the user, and determining a confidence score that the individual is the user by comparing, using a machine learning model, the plurality of biometric sub attributes associated with the individual to the plurality of stored sub attributes associated with the identity. The method can also involve performing an action that includes one of (i) preventing the individual from accessing the at least one resource in response to determining the confidence score is below a pre-set threshold or (ii) allowing the individual to access the at least one resource in response to determining the confidence score is above the pre-set threshold.

In some embodiments, a non-transitory computer-readable medium can include instructions that are executable by a processor for causing the processor to perform operations. The operations can involve receiving a request from a device indicating an identity of a user and an intention of the user to access at least one resource of a computing system at a terminal of the computing system, and determining, based on captured sensor data, a plurality of sets of biometric data. Each set of biometric data can be associated with an individual of a plurality of individuals within a first predetermined distance from the terminal. The operations can also involve decomposing at least one of the plurality of sets of biometric data into a plurality of biometric sub attributes associated with the individual, retrieving a plurality of stored sub attributes associated with the identity of the user, and determining a confidence score that the individual is the user by comparing, using a machine learning model, the plurality of biometric sub attributes associated with the individual to the plurality of stored sub attributes associated with the identity. The operations can also involve performing an action that includes one of (i) preventing the individual from accessing the at least one resource in response to determining the confidence score is below a pre-set threshold or (ii) allowing the individual to access the at least one resource in response to determining the confidence score is above the pre-set threshold.

In some embodiments, a system can include a communication interface, a processor, and a memory communicatively coupled to the processor. The memory can include instructions executable by the processor for causing the processor to perform operations. The operations can involve receiving, from a device, a request including an indication of an identity of a user and an intention of the user to access at least one resource of a computing system at a terminal of the computing system, and determining, based on captured sensor data, a plurality of sets of biometric data. Each set of biometric data can be associated with an individual of a plurality of individuals. The operations can also involve determining a confidence score that the individual is the user by comparing, using a machine learning model, the plurality of sets biometric data associated with the individual to a plurality of stored sets of biometric data associated with the identity, and determining, based on the identity of the user and the intention to access the at least one resource, a plurality of potential requests based on a plurality of characteristics of previous requests of the user in response to determining the confidence score is above a pre-set threshold. Each potential request of the plurality of potential requests can indicate at least a quantity of the at least one resource. The operations can also involve displaying the plurality of potential requests in the communication interface, receiving a selection of a potential request of the plurality of potential requests, and controlling access by the user to the at least one resource indicated by the potential request of the plurality of potential requests in response to receiving the selection of the potential request.

In some embodiments, a method can involve receiving, from a device, a request including an indication of an identity of a user and an intention of the user to access at least one resource of a computing system at a terminal of the computing system, and determining, based on captured sensor data, a plurality of sets of biometric data. Each set of biometric data can be associated with an individual of a plurality of individuals. The method can also involve determining a confidence score that the individual is the user by comparing, using a machine learning model, the plurality of sets biometric data associated with the individual to a plurality of stored sets of biometric data associated with the identity, and determining, based on the identity of the user and the intention to access the at least one resource, a plurality of potential requests based on a plurality of characteristics of previous requests of the user in response to determining the confidence score is above a pre-set threshold. Each potential request of the plurality of potential requests can indicate at least a quantity of the at least one resource. The method can also involve displaying the plurality of potential requests in a communication interface, receiving a selection of a potential request of the plurality of potential requests, and controlling access by the user to the at least one resource indicated by the potential request of the plurality of potential requests in response to receiving the selection of the potential request.

In some embodiments, a non-transitory computer-readable medium can include instructions that are executable by a processor for causing the processor to perform operations. The operations can involve receiving, from a device, a request including an indication of an identity of a user and an intention of the user to access at least one resource of a computing system at a terminal of the computing system, and determining, based on captured sensor data, a plurality of sets of biometric data. Each set of biometric data can be associated with an individual of a plurality of individuals. The operations can also involve determining a confidence score that the individual is the user by comparing, using a machine learning model, the plurality of sets biometric data associated with the individual to a plurality of stored sets of biometric data associated with the identity, and determining, based on the identity of the user and the intention to access the at least one resource, a plurality of potential requests based on a plurality of characteristics of previous requests of the user in response to determining the confidence score is above a pre-set threshold. Each potential request of the plurality of potential requests can indicate at least a quantity of the at least one resource. The operations can also involve displaying the plurality of potential requests in a communication interface, receiving a selection of a potential request of the plurality of potential requests, and controlling access by the user to the at least one resource indicated by the potential request of the plurality of potential requests in response to receiving the selection of the potential request.

In some embodiments, a system can include a processor and a memory communicatively coupled to the processor. The memory can include instructions executable by the processor for causing the processor to perform operations. The operations can involve receiving a request from a device to access a first profile associated with a user. The first profile can be associated with resource distribution for the user. The request can include biometric data of the user. The operations can also involve determining, based on the biometric data, that the user accessed a second profile associated with the user, merging the first profile with the second profile into a third profile associated with the user in response to determining that the user accessed the second profile of the user, and removing at least one of the first profile and the second profile in response to merging the first profile and the second profile.

In some embodiments, a method can involve receiving a request from a device to access a first profile associated with a user. The first profile can be associated with resource distribution for the user. The request can include biometric data of the user. The method can also involve determining, based on the biometric data, that the user accessed a second profile associated with the user, merging the first profile with the second profile into a third profile associated with the user in response to determining that the user accessed the second profile of the user, and removing at least one of the first profile and the second profile in response to merging the first profile and the second profile.

In some embodiments, a non-transitory computer-readable medium can include instructions that are executable by a processor for causing the processor to perform operations. The operations can involve receiving a request from a device to access a first profile associated with a user. The first profile can be associated with resource distribution for the user. The request can include biometric data of the user. The operations can also involve determining, based on the biometric data, that the user accessed a second profile associated with the user, merging the first profile with the second profile into a third profile associated with the user in response to determining that the user accessed the second profile of the user, and removing at least one of the first profile and the second profile in response to merging the first profile and the second profile.

BRIEF DESCRIPTION OF THE DRAWINGS

FIG. 1 is a block diagram illustrating one example of a resource distribution system utilizing a machine learning based biometric identification.

FIG. 6 is a flowchart of a process for creating a customized graphical user interface based on biometric identification, in accordance with at least one embodiment.

DETAILED DESCRIPTION

Figure 2:
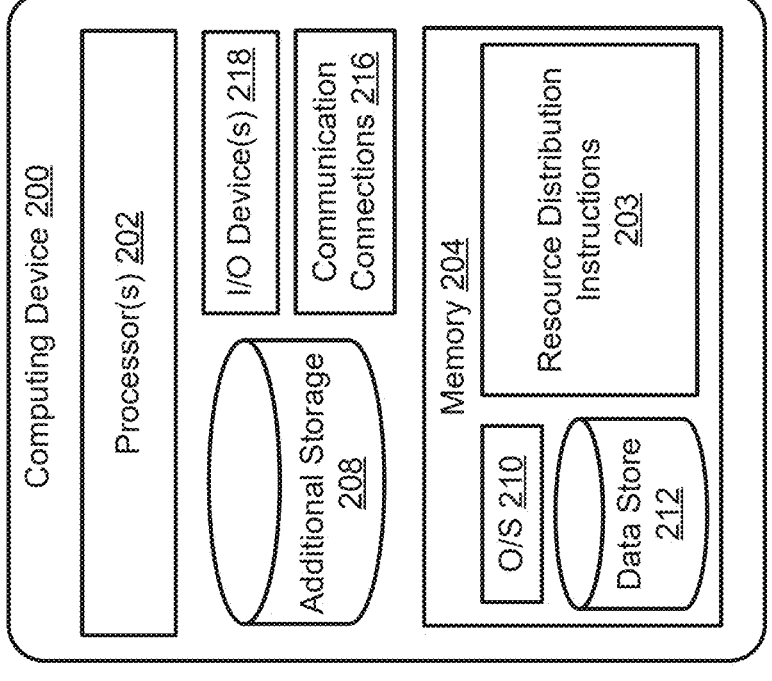
FIG. 2 illustrates an example computing device that may implement biometric identification-based authorization in a resource distribution computing system.

Certain aspects and features of the present disclosure relate to facilitating access to resources by using biometric identification. In one example, a system may be operative to receive advance notice of a user's intention to access resources and expedite access in response. The system may also be operative to improve the accuracy of biometric identification by comparing captured biometric data to biometric data of known fraudulent actors. And the system may also be operative to utilize biometric data associated with verified transactions to merge user profiles.

A biometric identifier may be a user's facial geometry, a user's voice, a user's iris, a user's fingerprint(s), a user's gait, a user's signature pattern, a user's hand geometry, a user's earlobe geometry, or any other unique user characteristic. Each of these biometric identifier's is made up of a plurality of sub-attributes. For example, some of the sub attributes associated with a user's facial geometry may be a distance between the user's eyes, the angle of the user's eyes relative to the nose, the length of the user's philtrum, etc. Similarly, a user's voice is made up of a plurality of sub-attributes comprising average pitch, rate of change in pitch, pitch maxima, pitch minima, speed of speech, accents, etc.

Biometric identifiers may be captured electronically as biometric data. For example, biometric data associated with a user's facial geometry may be a picture file, biometric data associated with a user's voice may be an audio file, biometric data associated with a user's gait may be a video file, etc.

Computer systems may transform biometric data into vectorized representations comprising sub-attributes extracted from the biometric data. The vectorized representations may be used to train a machine learning model. Once a machine learning model is trained, a computer may calculate a confidence score, a confidence that the user is requesting to distribute resources of an account they are authorized to access, by capturing new biometric data, vectorizing the new biometric data into new biometric sub attributes, and comparing, using the trained machine learning model, the new biometric sub-attributes with stored biometric sub-attributes known to belong to the user.

The trained machine learning model may be trained to conduct 1:1 biometric identification, 1:N biometric identification, or 1:Many biometric identification. A 1:1 biometric identification determines a match between biometric sub-attributes and sets of biometric sub-attributes in the training data belonging to a single individual. A 1:N biometric identification determines a match between biometric sub-attributes and sets of biometric sub-attributes in the training data belonging to a group of size N individuals. A 1:Many biometric identification determines a match between biometric sub-attributes and sets of biometric sub-attributes in the training data belonging to any individual. Biometric identification becomes increasingly computationally expensive as the group of size N grows.

A user device can be initially connected to a resource distribution computing system (e.g., a directory) through which the resource is to be distributed. In some examples, the user device can be, for example, a personal computer, a laptop computer, a tablet, a smart phone, etc. In one example, the user device may be communicatively coupled to the remote resource distribution computing system through the Internet. In such an example, communications between the user device and the remote resource distribution computing system can be conducted using a web browser or an application installed on the user device and may employ various cryptographic communication protocols. In one example, the resource distribution system may be a virtual computing system, and the resource may be a virtual computing resource. In another example, the remote resource distribution computing system may be a financial services computing system, and the resource may be a monetary sum of a given value.

In some examples, the user device may send a request to the resource distribution system. The request may indicate a user profile, an account, the resources the user intends to access, a terminal the user intends to access, or a location of the user device. A user profile may comprise information to identify the user (e.g. a name, employee number, date of birth, driver's license number, social security number etc.), and any accounts the user is authorized to access. The request may be manually initiated by the user, or it may be automatically sent to the resource distribution system.

In one example, the user may input the request into an application on the user device. For example, the application may be configured to receive text or audio input. In response to the user input, the user device may send the request to the resource distribution system. In another example, the user device may be equipped with Bluetooth, GPS, or other location services. The user device may be configured to send a request to the resource distribution system when the user device comes within a pre-determined distance of a terminal of the resource distribution system.

The resource distribution system, may, in response to receiving the request, conduct biometric identification on any individual that approaches a plurality of terminals. The plurality of terminals may be identified by the request or may be a plurality of terminals within a pre-determined distance from the user device when the user inputs the request.

The resource distribution system may be configured to receive a plurality of requests from a plurality of users. The resource distribution system may perform 1:N biometric identification to authenticate an individual as one of the plurality of users. Alternatively, the resource distribution system may iteratively perform 1:1 biometric identification to authenticate the user.

In response to calculating a confidence score above a predetermined threshold, the resource distribution system may be configured to allow the user to access resources of the resource distribution system. In response to calculating a confidence score above the predetermined threshold, the resource distribution system may also determine which resources the user is likely to access. The resource distribution system may provide the resources the user is likely to access at the terminal.

Using biometric identification to permit or deny a request can improve the efficiency of resource distribution systems. Typically, resource distribution systems prompt users to provide information to authenticate their identities. But biometric identification can be automatically initiated in response to a request, removing a need for the resource distribution system to use compute resources to prompt a user for authentication information. As a result, the resource distribution system can authenticate the user more quickly than traditional authentication methods. Faster authentication methods lead to faster service. In addition, biometric identification may provide more accurate authentication for permitting or denying requests, thereby improving security of resource access.

In some examples, the resource distribution system may be configured to restrict access to resources and conduct additional biometric authentications in response to calculating a confidence score below the pre-determined threshold. The additional biometric identifications calculate, using the same trained machine learning model, a fraud score. The trained machine learning model receives the inputs of profiles belonging to known fraudulent actors and biometric sub-attributes as inputs. The trained machine learning model outputs a fraud score representing a confidence that the individual near the terminal is a known fraud actor. The resource distribution system may restrict access to resources in response to calculating a fraud score above a predetermined threshold. The resource distribution system may issue an alert to an operator of the resource distribution system.

Two-step biometric authentication can enhance the security of biometric identification without increasing computational cost. Biometric identification may be one to many identification, 1:N biometric identification, or 1:1 biometric identification. Conducting 1:1 biometric identification, followed by 1:N biometric identification yields many of the benefits of 1:Many biometric identification with a fraction of the computational costs.

In another example system, a resource distribution system may merge user profiles based on biometric identification. A user profile may include biographical information such as name, date of birth, address, driver's license number, or any other data that may be used to identify a user. Profiles may also include information about which accounts a user is allowed to access. An account may be a record of resources a user has deposited with or borrowed from the resource distribution system.

Stored sets of biometric sub-attributes may be associated with a user profile. Machine learning models may group the biometric sub-attributes into clusters associated with the same individual. The trained machine learning model may determine that a cluster contains more than one user profile. In response to determining that a cluster contains more than one user profile, the resource distribution system may merge user profiles associated with the same individual. The resource distribution system may also prompt the individual to update their biographical information or to authorize the merge.

Users may create multiple profiles within a resource distribution system that cannot be identified and merged through biographical information. For example, a user may create a first profile open a checking account at their local bank. Some time later, after the user has changed their name and moved states, the user may create a second profile and open a savings account. The resource distribution system may not be able to match the biographical information from the first profile with the biographical information because much of the information has changed.

Storing multiple profiles for the same user increases the storage required to operate the resource distribution system, weakens training data for future authentications, and limits the services that the resource distribution system may provide to the user. Biometric sub-attributes are more stable than biographical information. Merging profiles based on biometric identification increases the accuracy of merging profiles, reduces the storage required to operate the resource distribution system, and allows the resource distribution system to offer additional services.

FIG. 1 is a block diagram illustrating one example of a resource distribution computing system 100 utilizing a machine learning based biometric identification. In some examples, the resource distribution computing system 100 may be operated by an owner or operator of a resource distribution computing system 100. In other examples, the resource distribution computing system 100 may be operated on behalf of an owner or operator of the resource distribution computing system 100. In some examples, the resource distribution computing system 100 may be a computing system of an entity such as a cloud service provider that facilitates distribution of computing resources such as processing and storage resources to users or a financial institution that facilitates distribution of resources such as monetary payments to users. In some examples, the resource distribution computing system 100 may be communicatively coupled to one or more servers 130 or other resource distribution computing systems and may utilize the one or more servers 130 or other resource distribution computing systems to distribute resources to users at least with respect to certain modes of distribution.

In some examples, communications between the user device 110 and resource distribution computing system 100 may be conducted using a web browser. In other examples, communications between the user device 110 and resource distribution computing system 100 may occur using an application installed on the user device 110.

The resource distribution computing system 100 may include various processing and other hardware and software or application components. The resource distribution computing system 100 may be a standalone computing system such as a desktop or laptop computer, a mobile device, etc. In other examples, the resource distribution computing system 100 may be a server, or a distributed computing system having multiple servers, virtual machines, etc. In still other examples, the resource distribution computing system 100 may be a cloud-based computing system that utilizes one or more physical or virtual servers and data storage of a cloud service provider.

The resource distribution computing system 100 may communicate with a terminal 120 over a network. The terminal 120 may be an access point of the resource distribution computing system 100. Examples of the terminal 120 in a financial services computing system may include automated teller machines (ATMs) or computers operated by a bank teller. Examples of the terminal 120 in a virtual computing system may be a computer configured to access resources of a virtual computing system. The network may be a local area network (LAN), a wide-area network (WAN) such as the Internet, an institutional network, cellular or other wireless networks, virtual networks such as an intranet or an extranet, a satellite network, etc. In some embodiments the resource distribution computing system 100 may be a component of the terminal 120.

In some embodiments, the terminal 120 can include sensors 128. In other embodiments, the sensors 128 can be standalone devices. The sensors 128 may capture biometric data 129. The sensors 128 may be a camera, microphone, weight sensor, fingerprint scanner, etc. In some embodiments, the terminal 120 is equipped with a user interface 126 that may include a microphone, screen, speakers, or touchscreen.

In some embodiments, the resource distribution computing system 100 may communicate with an authentication model 140 that includes a trained machine-learning model 150. In other embodiments, the resource distribution computing system 100 may contain the authentication model 140. The resource distribution computing system 100 can provide input data 152 to the trained machine-learning model 150. The input data 152 may include user profile 154. The input data 152 may also include biometric sub-attributes 156. The trained machine-learning model 150 may be trained to generate an output 518 based on input of some or all of the input data 152 to the trained machine-learning model 150.

The output 158 of the trained machine-learning model 150 may be a confidence score 160 that the biometric sub-attributes match the stored biometric sub-attributes associated with the user profile. Various restrictions may be placed on the output 158 of the trained machine-learning model 150.

In some examples, configuring the resource distribution computing system 100 to initiate a resource transfer may involve configuring a resource distribution component implemented as, for example, programming in a memory of the resource distribution computing system 100, an application that executes on the resource distribution computing system 100, or a separate hardware component that is communicatively coupled to the resource distribution computing system 100. The resource distribution component may be configured by, for example, sending a resource distribution command message containing configuration or resource distribution initiation instructions to the resource distribution component. The resource distribution component may thus be configured and subsequently caused to initiate a distribution of the resource.

In some examples, the resource distribution computing system 100 may communicate with a user device 110. The user device 110 may send a request 101 for resources to the resource distribution computing system 100. The resource distribution computing system 100 may send an alert or notification, or instructions to the user device 110. In one example, a user inputs the request 101 into a user device 110, and the user device 110 may send a request 101 to the resource distribution computing system 100 in response to receiving the input.

In another example, an application may be installed on the user device 110 to determine when the user device 110 comes within a predetermined distance (e.g., fifty feet) of the terminal 120 and sends a request 101 in response to determining that the user device 110 is within the predetermined distance of the terminal 120. An example in a financial services computing system may be detecting when a user approaches an ATM or branch of a financial services institution.

In one example, the user device 110 may determine that the user device 110 is within the predetermined distance by tracking its own location through GPS services and comparing the GPS location of the user device 110 to known locations of the terminal 120. In another example, the user device 110 and the terminal 120 may be equipped with Bluetooth. The user device 110 may determine that the user device is within a Bluetooth pairing range for the terminal 120. The user device 110 may send the request 101 for the resources to the terminal 120 via Bluetooth.

In one example, the resource distribution computing system 100 may communicate with the terminal 120. A user may input the request 101 into the user interface 126 of the terminal 120. In response to receiving the request 101, the terminal 120 may send the request 101 to the resource distribution computing system 100. A request 101 input into the terminal 120 may be typed or spoken. In examples comprising a spoken request 101 input into a terminal 120, the request 101 may include biometric data 129 (e.g., vocal data of the user).

In some examples, the resource distribution computing system 100 may capture biometric data 129 in response to receiving the request 101. The resource distribution computing system 100 may conduct biometric identification to authenticate the identity of the user. To conduct biometric identification, sensors 128 can capture biometric data 129 associated with any individuals that approach the terminal 120. The sensors 128 may be a camera, microphone, pressure sensor, or any other sensor suitable to capture biometric data 129.

The resource distribution computing system 100 may receive the biometric data 129 captured by the sensors 128 and calculate biometric sub-attributes 156 from the biometric data 129. Biometric sub-attributes 156 may be calculated using a machine learning model trained to identify points of interest in the biometric data and take measurements of points of interest. The machine learning model may or may not be included in the trained machine-learning model 150. Alternatively, the terminal 120 may calculate the biometric sub-attributes 156 before sending the biometric sub-attributes 156 to the resource distribution computing system 100.

The resource distribution computing system 100 may retrieve a plurality of stored biometric sub-attributes 157 from its memory or from server 130. The stored biometric sub-attributes 157 may be associated with past requests and can be associated with a user. For example, the stored biometric sub-attributes 157 may be associated with past requests successfully completed under a same user profile 154.

The resource distribution computing system 100 may provide input data 152 including the user profile 154, the biometric sub-attributes 156, or the stored biometric sub-attributes 157 to an authentication model 140. The authentication model 140 may be a trained machine-learning model 150. The trained machine-learning model 150 may receive the input data 152 and generate an output 158 including a confidence score 160. The trained machine-learning model 150 may be trained to output a percentage confidence that the biometric sub-attributes 156 and the stored biometric sub-attributes 157 correspond to the same user that is associated with the user profile 154. The authentication model 140 may return the confidence score 160 to the resource distribution computing system 100. In some embodiments, authentication model 140 is a component of resource distribution computing system 100.

The resource distribution computing system 100 can allow the user to access resources in response to determining that the confidence score 160 is above a pre-determined threshold (e.g., 0.75). In addition, if the confidence score 160 is above the pre-determined threshold, the resource distribution computing system 100 can store the biometric sub-attributes 156 in the stored biometric sub-attributes 157. The resource distribution computing system 100 may also allow the user to access only a portion of resources in response to determining that the confidence score 160 is between two predetermined thresholds (e.g., 0.5 and 0.75). Upon determining that the user is allowed to access some or all of the resources, the resource distribution computing system 100 can output a command to control a production of the resources. That is, the resource distribution computing system 100 may control an ATM or other dispensing machine to produce the resource.

The resource distribution computing system 100 may alternatively restrict access to the resources in response to determining that the confidence score 160 is below the pre-determined threshold. Upon determining that the user is prohibited from accessing the resources, the resource distribution computing system 100 can output a command to prevent a production of the resources. That is, the resource distribution computing system 100 may control an ATM or other dispensing machine to prohibit the machine from producing the resources associated with the request. In some examples, the resource distribution computing system 100 may conduct further operations in response to determining that the confidence score 160 is below the pre-determined threshold. For example, the resource distribution computing system 100 may request and process additional identifying information (e.g., additional biometric data) associated with the user. Or, the resource distribution computing system 100 may instruct that manual authentication of the user is to be conducted.

In one example, the resource distribution computing system 100 may check to see if the individual that approached the terminal 120 is a known fraud actor based on the biometric data 129 captured from the individual. The resource distribution computing system 100 may retrieve the stored biometric sub-attributes 157 associated with known fraud actors. The authentication model may 140 may be configured to conduct 1:N biometric identification and return a fraud score. A fraud score may be a percentage confidence that the biometric data 129 belongs to a known fraud actor. The resource distribution computing system 100 may restrict access to resources in response to determining a fraud score above a predetermined threshold or allow access to resources in response to determining a fraud score below a predetermined threshold. The resource distribution computing system 100 may also issue an alert to user device 110 in response to determining a fraud score above a predetermined threshold.

In another example, the resource distribution computing system 100 may calculate an updated confidence score. The resource distribution system may calculate an updated confidence score in response to a determining a confidence score below a pre-set threshold. In this example, the resource distribution computing system 100 may expand the inputs of the trained machine-learning model 150 to include transaction details and stored transaction details. Transaction details and stored transaction details may include information about a terminal of request, a time of request, an account of request, a resource value, or a resource type. The trained machine-learning model 150 may be the same trained machine-learning model 150 used to determine a confidence score or it may be a separate trained machine learning model. The resource computing system may be configured to allow the user to access resources in response to determining an updated confidence score above the pre-set threshold.

FIG. 2 illustrates an example computing device that may implement biometric identification based authorization in a resource distribution computing system. Aspects of FIG. 2 are described with respect to the components in FIG. 1.

In some embodiments, the computing device 200 may include one or more processors (e.g., processor(s) 202). The processor(s) 202 may be implemented in hardware, computer-executable instructions, firmware, or combinations thereof. Computer-executable instruction or firmware implementations of the processor(s) 202 may include computer-executable or machine-executable instructions written in any suitable programming language.

Computing device 200 may include memory 204. The memory 204 may store computer-executable instructions that are loadable and executable by the processor(s) 202, as well as data generated during the execution of these programs. The memory 204 may be volatile (such as RAM) and/or non-volatile (such as ROM, flash memory, etc.). The computing device 200 may include additional storage 206, which may include removable storage and/or non-removable storage. The additional storage 206 may include, but is not limited to, magnetic storage, optical disks and/or tape storage. The disk drives and their associated computer-readable media may provide non-volatile storage of computer-readable instructions, data structures, program engines, and other data for the computing devices. In some implementations, the memory 204 or additional storage 206 may individually, or collectively, include multiple different types of memory, such as SRAM, DRAM, or ROM.

The memory 204 and/or additional storage 208 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 204 and the additional storage 208 are examples of computer storage media. Memory 204 and/or additional storage 208 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which may be used to store the desired information and which may be accessed by the computing device 200. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 204 may include an operating system 210 and one or more data stores 212, and/or one or more application programs, engines, or services for implementing the features disclosed herein, such as the features provided by the resource distribution computing system 100.

The memory 204 may be include resource distribution instructions 203 executable by processor 202. The resource distribution instructions 203 may cause the processor 202 to receive requests through I/O device(s) 218 to access resources at a terminal 120. The resource distribution instructions 203 may also cause the processor 202 to send a signal to sensors to capture sets of biometric data 129 from any individual that approaches terminal 120. After receiving the biometric data 129, the processor 202 may decompose the biometric data 129 into a plurality of biometric sub-attributes 156. The processor 202 may send the biometric sub-attributes 156 to authentication model 140. The processor 202 may also retrieve stored biometric sub-attributes 157 and user profile 154 from memory 204 or from server 130. The processor 202 may send the user profile 154 or stored biometric sub-attributes 157 to authentication model 140. The authentication model 140 may be controlled by processor 202 and return a confidence score 160 based on the received input data. The processor 202 may prevent or allow the individual to access resources based on the confidence score 160.

The computing device may also contain communications connection(s) 216 that allow the computing device 200 to communicate with a stored database, another computing device, a server, user terminals and/or other devices (e.g., via one or more networks, not depicted). The computing device may also include I/O device(s) 218, such as a keyboard, a mouse, a pen, a voice input device, a touch input device, a display, speakers, a printer, etc.

Figure 3:
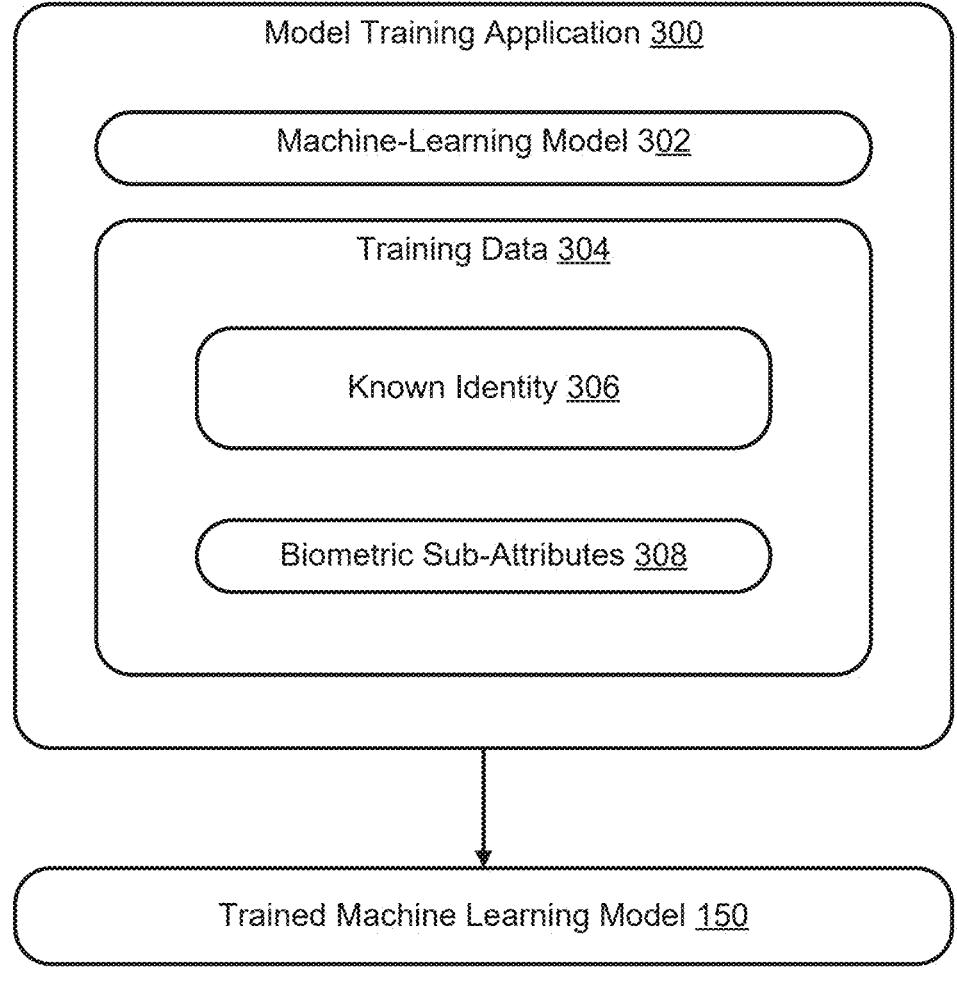
FIG. 3 is a block diagram of an example of a model-training application that may be implemented to train a machine-learning model to generate a trained machine-learning model, such as the trained machine-learning model of FIG. 1.

FIG. 3 is a block diagram of an example of a model-training application 300 that may be implemented to train a machine-learning model 302 to generate a trained machine-learning model, such as the trained machine-learning model 150 of FIG. 1. The model-training application 300 may be a part of the computing device 200, or the model-training application 300 may be separate and remote from the computing device 200. Training the machine-learning model 302 may transform the machine-learning model 102 from an untrained state to a trained state (i.e., to a trained machine-learning model).

A "machine learning model' (ML model) may refer to a software engine configured to be run on one or more processors to provide a confidence score that the captured biometric data 129 belongs to the user associated with the user profile. An ML model may be generated using sample data (e.g., training data) to make predictions on test data. One example is an unsupervised learning model. Another example type of model is supervised learning that may be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSMAY), random forest algorithm, support vector machine (SVM), or any model described herein. Supervised learning models may be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks may employ using wide and tensorized deep architectures, convolutional layers, dropout, various neural activations, and regularization steps.

Various techniques may be utilized to train the machine-learning model 302. For example, training data 304 may be provided to the machine-learning model 302 in an iterative manner to enable the machine-learning model 302 to identify trends or relationships in the training data 304. The machine-learning model training may be supervised training, unsupervised training, or a semi-supervised training. Parameter or hyperparameter adjustment may also be utilized to minimize a loss function of the machine-learning model 302.

Training the machine-learning model 302 may include accessing the training data 304, which may be stored, for example, at the computing device 200 or at a database or another storage location that is remote from but accessible by the computing device 200. The training data may include known identity 306. The known identity 306 may include, among other information, a user profile. The training data 304 may also include biometric sub-attributes 308 that are vectorized representations of biometric data 129. In some examples, one or more the biometric sub-attributes 308 may be weighted prior to being provided to the machine-learning model 302 for training. For example, if it is understood that more recent sets of biometric sub-attributes are more accurate than older sets of biometric sub-attributes, then more recent sets of biometric sub-attributes may be assigned more weight during training of the machine-learning model 302.

Various fitting, estimation, or other model-training optimization techniques may be used to ensure that, upon evaluation, the predictive output of the trained machine-learning model 150 is accurate given the input data (i.e., to minimize the loss function). The resulting trained machine-learning model 150 may then be deployed for application to newly received input data, as described above.

Figure 4:
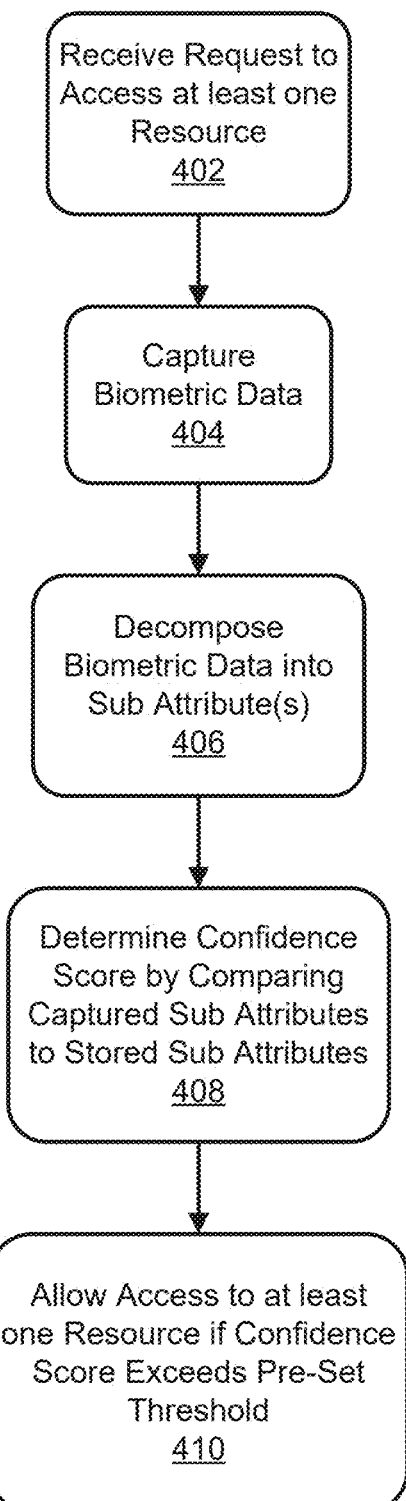
FIG. 4 depicts a flowchart of a process for a transaction using biometric identification according to some embodiments.

FIG. 4 depicts a flowchart of a transaction using biometric identification according to some embodiments. The process of FIG. 1 may be performed by the resource distribution computing system 100 in FIG. 1 or the computing device 200 in FIG. 2. At block 402, the processor can receive a request from to access resources within a resource distribution system. The processor may receive the request from a terminal. The processor may receive the request from a user device.

At block 404, in response to receiving the request, the processor can capture biometric data from the user. In some examples, the biometric data may be captured by sensors. In other examples, the biometric data may be captured from the request. For example, a user may speak the phrase "I would like to access 20 units of resources." The audio data of this request may be both a request and biometric data.

At block 406, the processor can then decompose the biometric data into biometric sub-attributes. Biometric sub-attributes may be measurements taken from biometric data. Examples of biometric sub-attributes 156 may be a distance between a user's eyes, average pitch of voice, or speed of signature, etc.

At block 408, the processor can input stored biometric sub-attributes associated with the user profile and the captured biometric sub-attributes into a trained machine learning model to calculate a confidence score that the user is the user associated with the user profile. A confidence score may be a percentage or decimal, where values closer to 100% or 1.0 indicate a higher likelihood that the user is associated with the user profile. A confidence score may also be weighted by the strength of training data.

At block 410, the processor can perform an action of allowing the user to access the resources if the confidence score is above a pre-set threshold. Alternatively, the processor may perform an action of restricting access to the resources if the confidence score is below the pre-set threshold. An example of resources may be monetary sums in a financial services computing system or virtual compute resources in a virtual computing system.

Figure 5:
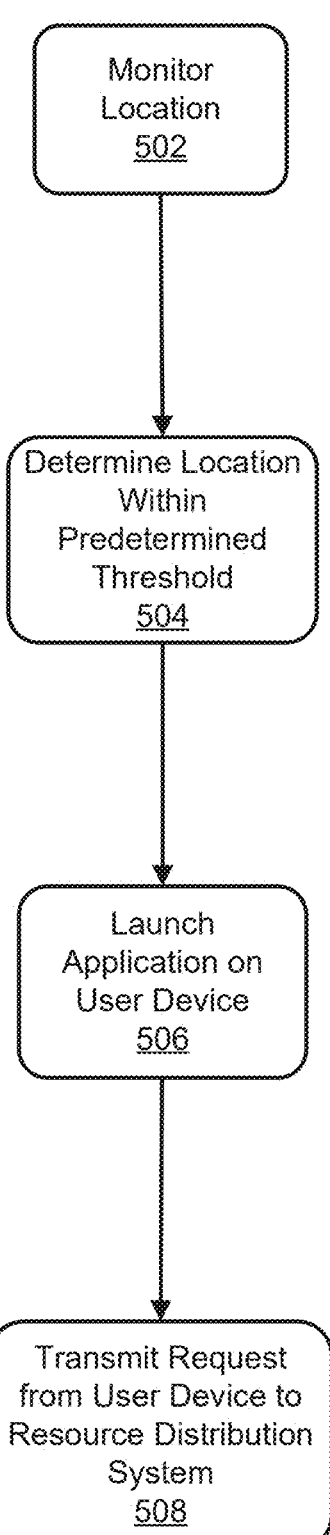
FIG. 5 is a flowchart of a process for automatically generating a request based on geographic location of a user, in accordance with at least one embodiment.

FIG. 5 is a flowchart of automatically generating a request based on geographic location of a user, in accordance with at least one embodiment. At block 502, a processor may be configured to monitor a user device's geographic location. Location monitoring may be active or background location monitoring. Location monitoring may be global location monitoring or local location monitoring. Absolute location monitoring may utilize GPS tracking. Local location monitoring may monitor for the presence of a user device and establish the location of a user device relative to other objects of interest, such as terminals.

At block 504, the processor determines that the user device entered a location within a predetermined distance from a terminal. In one example, the predetermined area may be a geographic location around a known location of a terminal. The processor may receive information from the user device about the GPS coordinates of the user device. The processor may compare the GPS coordinates to a known location of terminal. In another example, the processor may receive information from terminal about user devices within Bluetooth connectivity range of terminal.

At block 506, a resource distribution computing system may send a signal to launch an application on a user device. The signal may also include instructions commanding the user device to send a request indicating a user profile. The resource distribution system may use any send the signal via internet communications, Bluetooth, or any other electronic communication network.

The application may be configured to transmit a request from the user device to the resource distribution system as shown in block 508. This request may be accompanied by identity information that allows the resource distribution system to perform biometric identification using data for only the user that the device belongs to. The request may also be accompanied by biometric data known to be associated with the user.

Monitoring the location of a device known to be associated with a user may provide the processor advance notice of a user's intent to access resources at a future time. In response to the advance notice, the resource distribution computing system 100 may be configured to conduct biometric identification on any individual that approaches a terminal (e.g., any individual that is within a predetermined distance (e.g., ten feet) of the terminal). In one example, a user may walk into a branch of a financial institution, giving the teller terminals advance notice of a user's intent to access resources. Cameras within the branch may capture biometric data from the user and authorize the user before even getting to a teller station. Authenticating the user before arriving at the teller station allows the teller to provide faster service to the user.

FIG. 6 is a flowchart of customizing a user experience based on a positive biometric identification. At block 602, a processor can receive a request including an indication of an identify of a user and an intention of the user to access a resource. The user may access an application on the device that is associated with a computing system that provides the resource to provide the indication and the intention. Additionally or alternatively, the processor may receive the request by detecting that a user device of the user is within a predetermined distance of a terminal of the computer system. The indication and the identity can be received at the terminal of the computer system. The computer system may be a resource distribution computing system.

At block 604, the processor can determine sets of biometric data associated with individuals. The processor can capture sensor data that includes the sets of biometric data. Each set of biometric data can be associated with an individual of a set of individuals.

At block 606, the processor can determine a confidence score that the individual is the user. The processor can use a machine learning model to compare the sets of biometric data associated with the individual to stored sets of biometric data associated with the identity. A higher confidence score (e.g., closer to one) can indicate a higher likelihood that the individual is the user. If the confidence score is determined to be below a pre-set threshold, the processor may request the individual to input a passcode. Upon receiving the passcode and determining that the passcode matches a stored passcode associated with the identity of the user, the processor can determine that the confidence score is above the pre-set threshold.

At block 608, the processor can determine potential requests based on the identity of the user and the intention to access the resource. That is, based on the confidence score being above a pre-set threshold, the processor can determine the potential requests. If the confidence score is below the pre-set threshold, the processor can forgo determining the plurality of potential requests and prevent the user from accessing the resource. The processor can determine the potential requests based on characteristics of previous requests of the user. The previous requests can be indicated in a history of past requests that includes information about resources accessed, time of access, destination of distribution, etc. for the previous requests. Potential requests may be the most frequently requested resources. Potential requests may be determined by analyzing past requests. Potential resources may also be determined by comparing past requests to the current request. For example, the processor may determine a time of the request or a terminal of the request and compare the time or the terminal to times and terminals of the previous requests to determine the potential requests as previous requests with similar times or terminals. In an example scenario, a user requested to reallocate 20 units of a specific resource from account A to account B on each Friday of the preceding five weeks at 5:00 PM. The processor may determine that the user is likely to request to reallocate 20 units of the specific resource from account A to account B when a user issues a request at 5:00 PM on a Friday. Potential requests may be requests to distribute the at least one resource between two accounts. Potential requests may be requests to withdraw the at least one resource.

At block 608, the processor can display the potential requests in a communication interface. The communication interface can be a graphical user interface that allows a user to select one or more of the potential requests to execute. The processor may determine a maximum quantity of the resource that is to be distributed based on the confidence score. For example, a higher confidence score may be associated with a higher maximum quantity that the user is able to distribute. So, the processor can display a subset of the potential requests that indicate the quantity less than the maximum quantity.

At block 610, the processor can receive a selection of a potential request of the potential requests. The user can provide a user input at the communication interface indicating the selection of the potential request. The selection may be of a potential request in the subset of potential requests.

At block 612, the processor can control access by the user to the resource in response to receiving the selection. That is, the processor can cause the computing system to perform the distribution of the resource in response to receiving the selection.

Figure 7:
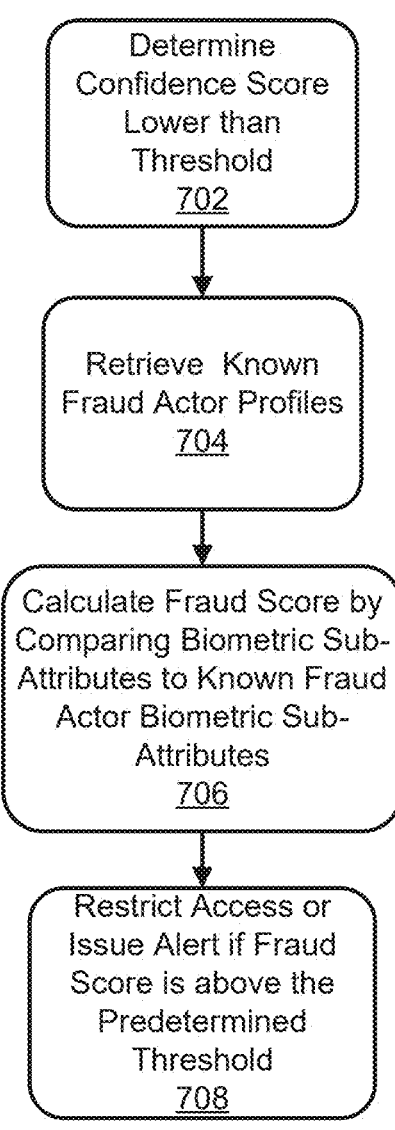
FIG. 7 illustrates a flowchart of a process for detecting fraudulent users according to at least one embodiment.

FIG. 7 illustrates a flowchart of a process for detecting fraudulent users according to at least one embodiment. At block 702, a resource distribution system determines the confidence is score below the pre-set threshold. Detecting fraudulent users may strengthen the initial biometric identification. For example, a biometric identification may return a confidence score of 75% while the pre-set threshold is 80%. Detecting that the user is not a known fraud actor may provide enough security to allow the user to access resources even though the confidence score does not meet the pre-set threshold.

At block 704, in response to determining the confidence score is below the pre-set threshold, the resource distribution system may retrieve profiles for known fraud actors. Known fraud actor profiles may include known fraud actor biometric sub-attributes. The resource distribution system may limit known fraud actors based on known fraud actors who have attempted to fraudulently access a particular account, a particular terminal, or a particular set of terminals.

At block 706, the resource distribution system can input the known fraud actor profiles and the biometric data 129 into the trained machine learning model. The trained machine learning model calculates a fraud score. The machine learning model may output a plurality of fraud scores for each known fraud actor. The trained machine learning model may output a maximum fraud score for any of the known fraud actors.

At block 708, the trained machine learning model may restrict access to the resources and the trained machine learning model may issue an alert to the user device or to the terminal. The alert may prompt a user to change passwords or confirm previous transactions. The resource distribution system may create a profile for a known fraud actor if the confidence score is lower than a pre-set threshold.

Figure 8:
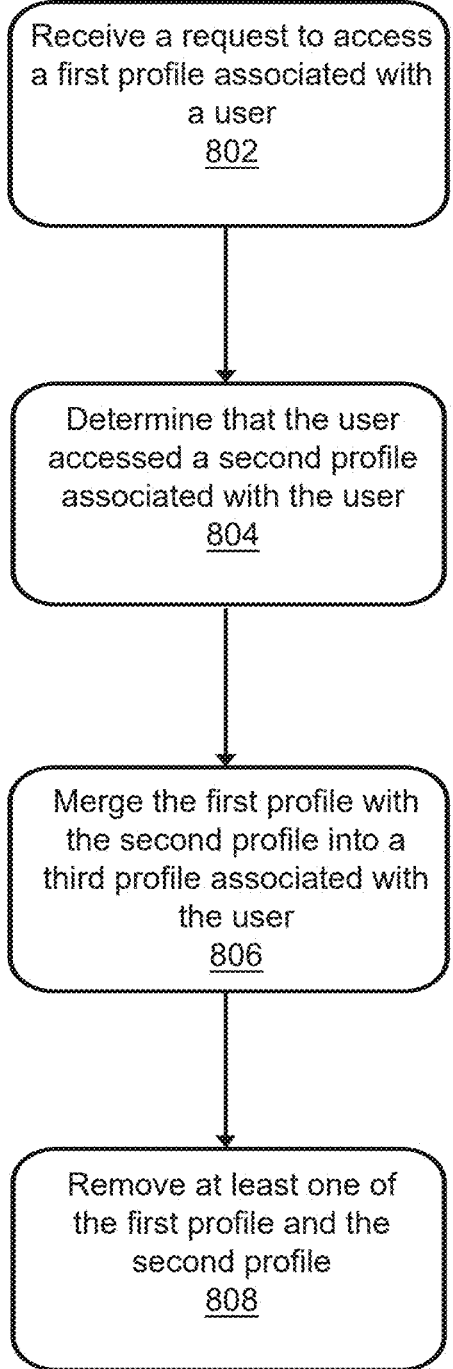
FIG. 8 is a flowchart of a process for merging user profiles according to at least one embodiment.

FIG. 8 is a flowchart of a process for merging user profiles according to at least one embodiment. At block 802, a processor receives a request to access a first profile associated with a user. The request can be received via an application executing on a device. The application can be associated with a resource distribution computing system and can be configured to capture biometric data in association with the request using at least one sensor (e.g., camera, microphone, fingerprint scanner, etc.) of the device. The first profile can be associated with resource distribution for the user and can include the biometric data of the user. For example, the request may include facial recognition or fingerprint identification of the user.

In some examples, the processor can provide access to the user to the first profile based on authenticating the user using the biometric data. For example, the processor can determine, based on captured sensor data, sets of biometric data that are each associated with an individual of a set of individuals. The processor can determine, based on the biometric data, a confidence score that the individual is the user by comparing, using a machine learning model, biometric sub attributes associated with the individual to stored sub attributes associated with the user. The processor can then perform an action based on the confidence score. For instance, the processor can prevent the user from accessing the first profile in response to determining that the confidence score is below a pre-set threshold or the processor can allow the user to access the first profile in response to determining the confidence score is above the pre-set threshold.

At block 804, the processor determines that the user accessed a second profile associated with the user. The processor can use the biometric data to determine that the user accessed the second profile. For example, the processor may receive an indication that the user accessed resources under a profile other than the profile that the user was biometrically identified to be associated with. The user may access the second profile through traditional authentication methods such as providing a username and password to a terminal or providing a photo identification card to an operator of a terminal. The second profile can include an indication of biometric data associated with the user. So, if the processor determines a match between the biometric data used to access the first profile and the biometric data associated with the second profile, the processor can determine that the first profile and the second profile are associated with the same user.

In some examples, the processor can receive a second request to access the second profile, and the second request can include biometric data of the user. The processor can determine a match between the biometric data of the request for the first profile and the biometric data of the second request for the second profile and then determine that the user accessed the second profile based on the match. The first profile may include a first attribute (e.g., name, address, government identification number, etc.) of the user and the second profile can include a second attribute of the user that is different from the first attribute. For instance, the first profile may include a first address of the user and the second profile can include a second address of the user. But, since the biometric data matches for the first profile and the second profile, the processor can determine that the user is associated with the first profile and the second profile.

At block 806, the processor merges the first profile with the second profile into a third profile. Merging profiles may include creating the third profile as a new profile and storing the first profile and the second profile under the new profile. Merging profiles may include transferring information from the first profile to the second profile. Or merging profiles may include transferring information from the second profile to the first profile. The processor can output a notification to the device requesting an approval to merge the first profile with the second profile in response to determining that the user accessed the second profile of the user. The processor can receive the approval from the device and merge the first profile and the second profile in response to receiving the approval.

At block 808, the processor removes at least one of the first profile and the second profile. If the new profile is created from the first profile and the second profile, then one or both of the first profile and the second profile can be removed. If information of the first profile is transferred to the second profile, then the first profile can be removed. If information of the second profile is transferred to the first profile, then the second profile can be removed. In addition, the processor may determine a newer profile and an older profile of the first profile and the second profile by comparing a first time that the first profile was last updated and a second time that the second profile was last updated. The profile can associate an account associate with the older profile with the user profile and then remove the older profile by deactivating the older profile. By removing one or more of the first profile and the second profile, memory resources are conserved by reducing a redundancy of the profiles for the user.

An example of merging profiles in a financial services computing system may involve merging a savings account, a checking account, a credit card, or mortgage at a bank. The accounts may be opened at separate times and may be stored in the resource distribution system under different user profiles. A user may open a checking account under a first profile. Later, the user may open a mortgage account under a second profile and link the mortgage account to an application on a user device. A resource distribution system may biometrically identify the user as the user associated with the second profile when a user walks into a bank. However, the user may access the checking account associated with the first profile. The resource distribution system may infer that the first profile and the second profile are associated with the same user and merge the profiles.

Some or all the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The various embodiments further may be implemented in a wide variety of operating environments, which in some cases may include one or more user computers, computing devices or processing devices which may be used to operate any of a number of applications. User or client devices may include any of a number of general-purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network may be, for example, a local area network, a wide-area network, a virtual private network, the Internet, an intranet, an extranet, a public switched telephone network, an infrared network, a wireless network, and any combination thereof.

Storage media computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which may be used to store the desired information and which may be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

a processor; and a memory communicatively coupled to the processor, the memory including instructions executable by the processor for causing the processor to perform operations comprising:

receiving a first request from a device to access a first profile associated with a user, the first profile being a first type of profile associated with resource distribution for the user, the first request including first biometric data of the user;

receiving a second request to access a second profile, the second request including second biometric data of the user, the second profile being a second type of profile associated with resource distribution that is different from the first type of profile;

determining a match between the first biometric data and the second biometric data;

determining, based on the match, that the user is associated with the first profile and the second profile;

determining, based on the match and the second request, that the user accessed the second profile associated with the user;

in response to determining that the user accessed the second profile of the user and that the user is associated with the first profile and the second profile, merging the first profile with the second profile into a third profile associated with the user by storing the first profile and the second profile under the third profile; and removing the first profile and the second profile in response to merging the first profile and the second profile into the third profile.

2. The system of claim 1, wherein the operations further comprise:

outputting a notification to the device requesting an approval to merge the first profile with the second profile in response to determining that the user accessed the second profile of the user;

receiving the approval from the device; and in response to receiving the approval, merging the first profile with the second profile.

3. The system of claim 1, wherein the operation of merging the first profile of the user with the second profile of the user comprises:

determining a newer profile and an older profile of the first profile and the second profile by comparing a first time that the first profile was last updated and a second time that the second profile was last updated;

associating at least one account associated with the older profile with the newer profile; and deactivating the older profile.

4. The system of claim 1, wherein the first profile includes a first attribute of the user and the first biometric data of the user, and the second profile includes a second attribute of the user and the second biometric data of the user, and wherein the operations further comprise:

determining that the first attribute of the first profile is different from the second attribute of the second profile;

determining that the first biometric data matches the second biometric data; and merging the first profile and the second profile in response to determining that the first biometric data matches the second biometric data.

5. The system of claim 1, wherein the operations further comprise:

subsequent to receiving the first request, determining, based on captured sensor data, a plurality of sets of biometric data, each set of biometric data being associated with an individual of a plurality of individuals;

determining, based on the first biometric data, a confidence score that the individual is the user by comparing, using a machine learning model, a plurality of biometric sub attributes associated with the individual to a plurality of stored sub attributes associated with the user; and performing an action that includes one of (i) preventing the user from accessing the first profile in response to determining the confidence score is below a pre-set threshold or (ii) allowing the user to access the first profile in response to determining the confidence score is above the pre-set threshold.

6. The system of claim 1, wherein the first request is received via an application executing on the device, wherein the application is associated with a resource distribution computing system, and wherein the application is configured to capture the first biometric data in association with the first request using at least one sensor of the device.

7. A method comprising:

receiving a first request from a device to access a first profile associated with a user, the first profile being a first type of profile associated with resource distribution for the user, the first request including first biometric data of the user;

receiving a second request to access a second profile, the second request including second biometric data of the user, the second profile being a second type of profile associated with resource distribution that is different from the first type of profile;

determining a match between the first biometric data and the second biometric data;

determining, based on the match, that the user is associated with the first profile and the second profile;

determining, based on the match and the second request, that the user accessed the second profile associated with the user;

in response to determining that the user accessed the second profile of the user and that the user is associated with the first profile and the second profile, merging the first profile with the second profile into a third profile associated with the user by storing the first profile and the second profile under the third profile; and removing the first profile and the second profile in response to merging the first profile and the second profile into the third profile.

8. The method of claim 7, further comprising:

outputting a notification to the device requesting an approval to merge the first profile with the second profile in response to determining that the user accessed the second profile of the user;

receiving the approval from the device; and in response to receiving the approval, merging the first profile with the second profile.

9. The method of claim 7, wherein merging the first profile of the user with the second profile of the user comprises:

determining a newer profile and an older profile of the first profile and the second profile by comparing a first time that the first profile was last updated and a second time that the second profile was last updated;

associating at least one account associated with the older profile with the newer profile; and deactivating the older profile.

10. The method of claim 7, wherein the first profile includes a first attribute of the user and the first biometric data of the user, and the second profile includes a second attribute of the user and the second biometric data of the user, and wherein the method further comprises:

determining that the first attribute of the first profile is different from the second attribute of the second profile;

determining that the first biometric data matches the second biometric data; and merging the first profile and the second profile in response to determining that the first biometric data matches the second biometric data.

11. The method of claim 7, further comprising:

subsequent to receiving the first request, determining, based on captured sensor data, a plurality of sets of biometric data, each set of biometric data being associated with an individual of a plurality of individuals;

determining, based on the first biometric data, a confidence score that the individual is the user by comparing, using a machine learning model, a plurality of biometric sub attributes associated with the individual to a plurality of stored sub attributes associated with the user; and performing an action that includes one of (i) preventing the user from accessing the first profile in response to determining the confidence score is below a pre-set threshold or (ii) allowing the user to access the first profile in response to determining the confidence score is above the pre-set threshold.

12. The method of claim 7, wherein the first request is received via an application executing on the device, wherein the application is associated with a resource distribution computing system, and wherein the application is configured to capture the first biometric data in association with the first request using at least one sensor of the device.

13. A non-transitory computer-readable medium comprising instructions that are executable by a processor for causing the processor to perform operations comprising:

receiving a first request from a device to access a first profile associated with a user, the first profile being a first type of profile associated with resource distribution for the user, the first request including first biometric data of the user;

receiving a second request to access a second profile, the second request including second biometric data of the user, the second profile being a second type of profile associated with resource distribution that is different from the first type of profile;

determining a match between the first biometric data and the second biometric data;

determining, based on the match, that the user is associated with the first profile and the second profile;

determining, based on the match and the second request, that the user accessed the second profile associated with the user;

in response to determining that the user accessed the second profile of the user and that the user is associated with the first profile and the second profile, merging the first profile with the second profile into a third profile associated with the user by storing the first profile and the second profile under the third profile; and removing the first profile and the second profile in response to merging the first profile and the second profile into the third profile.

14. The non-transitory computer-readable medium of claim 13, wherein the operations further comprise:

outputting a notification to the device requesting an approval to merge the first profile with the second profile in response to determining that the user accessed the second profile of the user;

receiving the approval from the device; and in response to receiving the approval, merging the first profile with the second profile.

15. The non-transitory computer-readable medium of claim 13, wherein the operation of merging the first profile of the user with the second profile of the user comprises:

determining a newer profile and an older profile of the first profile and the second profile by comparing a first time that the first profile was last updated and a second time that the second profile was last updated;

associating at least one account associated with the older profile with the newer profile; and deactivating the older profile.

16. The non-transitory computer-readable medium of claim 13, wherein the first profile includes a first attribute of the user and the first biometric data of the user, and the second profile includes a second attribute of the user and the second biometric data of the user, and wherein the operations further comprise:

determining that the first attribute of the first profile is different from the second attribute of the second profile;

determining that the first biometric data matches the second biometric data; and merging the first profile and the second profile in response to determining that the first biometric data matches the second biometric data.

17. The non-transitory computer-readable medium of claim 13, wherein the operations further comprise:

subsequent to receiving the first request, determining, based on captured sensor data, a plurality of sets of biometric data, each set of biometric data being associated with an individual of a plurality of individuals;

determining, based on the first biometric data, a confidence score that the individual is the user by comparing, using a machine learning model, a plurality of biometric sub attributes associated with the individual to a plurality of stored sub attributes associated with the user; and performing an action that includes one of (i) preventing the user from accessing the first profile in response to determining the confidence score is below a pre-set threshold or (ii) allowing the user to access the first profile in response to determining the confidence score is above the pre-set threshold.

\* \* \* \* \*